(No Model.)

E. W. PERRY, Jr.
CARRIER OR ENVELOPE FOR PHOTOGRAPHIC FILMS OR PLATES.

No. 463,705.          Patented Nov. 24, 1891.

Witnesses,
Robert Everett
James A. Rutherford

Inventor:
Enoch Wood Perry Jr.
By James L. Norris.
Atty.

UNITED STATES PATENT OFFICE.

ENOCH WOOD PERRY, JR., OF NEW YORK, N. Y., ASSIGNOR OF ONE-HALF TO EMIL KIPPER, OF ADAMS, MASSACHUSETTS.

CARRIER OR ENVELOPE FOR PHOTOGRAPHIC FILMS OR PLATES.

SPECIFICATION forming part of Letters Patent No. 463,705, dated November 24, 1891.

Application filed August 15, 1890. Serial No. 362,093. (No model.)

*To all whom it may concern:*

Be it known that I, ENOCH WOOD PERRY, Jr., a citizen of the United States, residing at New York, in the county of New York and State of New York, have invented new and useful Improvements in Carriers or Envelopes for Photographic Films or Plates, of which the following is a specification.

The object of this invention is to provide a novel, simple, and economical film or plate carrier adapted for use in a photographic-plate holder of the type commonly known as a "magazine-holder," whereby a film or plate of considerably smaller size than the carrier can be used in a plate-holder adapted for full-sized films or plates.

To accomplish these objects my invention involves the features of construction hereinafter described and claimed, reference being made to the accompanying drawings, in which—

Figure 1:
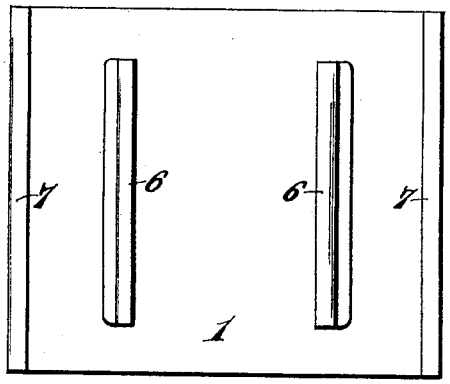
Figure 3:
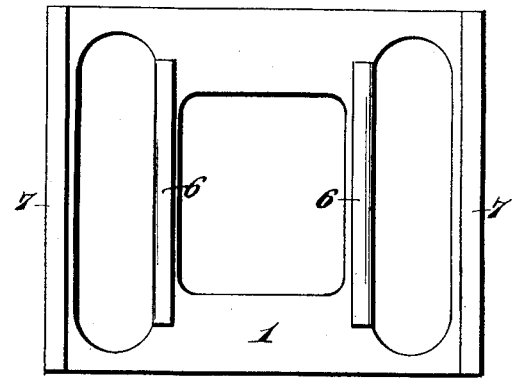
Figure 2:
Figure 4:

Figure 1 is a top plan view of a film or plate carrier constructed in accordance with my invention. Fig. 2 is a sectional view of the same. Fig. 3 is a top plan view of a modified form of carrier, and Fig. 4 is a sectional view of the same.

In order to enable those skilled in the art to make and use my invention, I will now describe the same in detail, referring to the drawings, wherein—

The numeral 1 indicates a film or plate carrier composed of any material suitable for the conditions required—such, for instance, as thin sheet metal—and formed integral at each edge with a lip or flange 7. These lips or flanges 7 are bent over upon the body of the carrier and pressed thereupon to form thickened edges for imparting rigidity to the body of the carrier.

The plate constituting the carrier is provided at a point remote from its side edges with a pair of immovable overhanging flanges 6, arranged parallel to each other and adapted to receive and engage or hold the edges of a film or plate introduced under the flanges and resting upon the body of the carrier. The film or plate holding flanges 6 may be a separate piece soldered or otherwise firmly attached to the face of the carrier 1, as in Figs. 1 and 2, or the carrier may be formed with openings, as in Figs. 3 and 4, to reduce its weight without in fact detracting from the necessary strength and stiffness. In the latter construction the film or plate holding flanges 6 are preferably formed integral with the carrier by bending the edges of one pair of openings toward each other, so as to overhang the carrier and serve to receive and hold the film or plate, as before explained.

A carrier constructed according to my invention is by its edges 7 adapted to be employed in a photographic-plate holder adapted for the employment of films or plates of full size, while the immovable overhanging flanges 6 adapt the carrier for films or plates of much smaller size than the carrier itself, and therefore I provide simple and economical means for holding films or plates of smaller size than the carrier and adapt the latter to be used in a plate-holder constructed for full-sized films or plates.

By constructing the plate which constitutes the carrier with permanently attached and immovable film or plate holding flanges, as described and shown, I am enabled to produce carriers of the character specified at a greatly reduced cost, and consequently it will be comparatively inexpensive to provide a series of the carriers with immovable film or plate holding flanges arranged at different distances apart and at different distances from the edges 7 of the carrier, whereby any desired size of film or plate can be used in a plate-holder adapted for full-sized films or plates. I am aware that carriers or plate-holders have been provided with adjustable devices for holding different-sized plates; but such are expensive and are not adapted to the ordinary photographic-plate holders of the type commonly known as "magazine-holders" for instantaneous or time exposures.

The construction of carrier illustrated in Figs. 3 and 4 is particularly adapted for a magazine plate-holder such as described in an application filed May 31, 1890, by Emil Kipper and Enoch Wood Perry, Jr., Serial No. 353,691, wherein a slide or platform is employed that acts to prevent the actinic effect upon the succeeding films or plates lying behind the exposed plate. I do not, however, confine myself to magazine plate-holders of any particular construction or type.

Having thus described my invention, what I claim is—

1. A film or plate carrier having immovable permanently attached film or plate holding flanges arranged at points remote from opposite edges of the plate for carrying films or plates of smaller size than the carrier, and adapting the latter to be used in a magazine plate-holder designed for full-sized films or plates, substantially as described.

2. A film or plate carrier having thickened opposite edges 7 and provided at points remote from such edges with a pair of immovably-attached film or plate holding flanges which extend parallel with the thickened edges of the carrier, substantially as described.

In testimony whereof I have affixed my signature in presence of two witnesses.

ENOCH WOOD PERRY, Jr.

Witnesses:
   J. H. CARMIENCKE,
   EMIL KIPPER.